US008739943B2

(12) United States Patent
Hopson et al.

(10) Patent No.: US 8,739,943 B2
(45) Date of Patent: Jun. 3, 2014

(54) VARIABLE TORQUE BRAKE AND DRUM SYSTEM

(75) Inventors: Brian C. Hopson, Cincinnati, OH (US);
Roy A. Stoner, Beavercreek, OH (US)

(73) Assignee: Force Control Industries, Inc.,
Fairfield, OH (US)

( * ) Notice: Subject to any disclaimer, the term of this patent is extended or adjusted under 35 U.S.C. 154(b) by 242 days.

(21) Appl. No.: 13/373,341

(22) Filed: Nov. 10, 2011

(65) Prior Publication Data

US 2012/0125722 A1    May 24, 2012

Related U.S. Application Data

(60) Provisional application No. 61/458,170, filed on Nov. 19, 2010.

(51) Int. Cl.
 *F16D 55/00*    (2006.01)
(52) U.S. Cl.
 USPC .......................... 188/72.8; 188/264 D; 192/94
(58) Field of Classification Search
 CPC .......... F16D 65/853; F16D 2055/0058; F16D 2065/784; F16D 2125/40; B60K 23/08; E01F 13/12; E01F 15/0438; E06B 2009/6881
 USPC ...................... 404/6; 256/13.1; 160/295, 296; 192/54.52, 89.26, 94; 254/356, 368, 254/378, 379; 242/423, 423.1, 423.2; 188/18 A, 71.5, 72.8, 82.1, 82.2, 82.6, 188/83, 134, 166, 187, 264 B, 264 D
 See application file for complete search history.

(56) References Cited

U.S. PATENT DOCUMENTS

| 1,141,230 | A | * | 6/1915 | Burke ............................. 188/83 |
| 2,027,135 | A | * | 1/1936 | Weldon ....................... 188/18 A |
| 2,104,174 | A | * | 1/1938 | Simons et al. ............. 192/70.27 |
| 2,596,318 | A | * | 5/1952 | Willi et al. ..................... 254/271 |
| 2,722,301 | A | * | 11/1955 | Francois ..................... 192/82 R |
| 3,220,526 | A | * | 11/1965 | Gattiker, Jr. .................. 192/150 |
| 3,638,773 | A |  | 2/1972 | Lewis et al. |
| 4,415,067 | A |  | 11/1983 | Cory |
| 4,538,713 | A | * | 9/1985 | Wasada ....................... 192/54.51 |
| 4,648,494 | A |  | 3/1987 | Yater |
| 7,125,197 | B2 |  | 10/2006 | Krewsun et al. |
| 7,736,084 | B2 |  | 6/2010 | Causey et al. |
| 7,818,920 | B2 | * | 10/2010 | Causey et al. ..................... 49/49 |
| 8,002,492 | B2 |  | 8/2011 | Gelfand |

* cited by examiner

*Primary Examiner* — Bradley King
*Assistant Examiner* — Stephen Bowes
(74) *Attorney, Agent, or Firm* — Jacox, Meckstroth & Jenkins

(57) ABSTRACT

A stationary shaft supports a fluid-tight rotatable drum which receives an elongated flexible restraining member. The shaft has a threaded portion which receives an actuating nut connected to rotate with the drum through a detent mechanism. Spaced compression springs extend axially between the nut and a stack of interfitting annular brake disks and brake plates, with the disks splined to the shaft and the plates rotatable with the drum. The stack is immersed in an oil-shear cooling fluid that contacts the drum, and the nut and springs are effective to compress the stack with increasing force in response to rotation of the drum for progressively increasing the resistance torque on the drum as the restraining member is pulled from the drum. The detent mechanism limits the compression force on the stack and the tension force on the restraining member while the drum continues to rotate.

15 Claims, 6 Drawing Sheets

US 8,739,943 B2

VARIABLE TORQUE BRAKE AND DRUM SYSTEM

BACKGROUND OF THE INVENTION

The present invention relates to apparatus for constructing a security barrier for preventing or controlling vehicle access along a roadway or path. The barrier sometimes includes an elongated vehicle capture net which is connected on each end to an elongated flexible restraining member such as a flexible strap or cable or reinforced rope which is pulled out from a brake controlled drum or spool, for example, as disclosed in U.S. Pat. Nos. 7,125,197 and 7,736,084. The apparatus disclosed in these patents uses straps which extend from spools, and rotation of the spools is controlled by a dry friction brake system having brake disks or caliper disks which brake the shaft supporting the spools on which the flexible straps are wound. As disclosed in U.S. Pat. No. 7,125,197, unwinding of the flexible restraining member or straps from the spools advances the spools on threaded portions of the shaft to compress the adjacent dry friction braking surfaces against each other. The vehicle is restrained or stopped by deploying the vehicle capture net which is connected on each end by a pair of straps wound on corresponding spools. When the vehicle collides with the capture net, the straps unwind from the corresponding spools and provide a restraining force of increasing magnitude on the straps.

High power absorption rates are required from each brake due to the short operating time of the brake. The dry friction brakes used under these conditions are subject to accelerated wear due to inherent thermal ablation of the friction surfaces. As the friction surfaces wear, the brake capacity to absorb the vehicle kinetic energy is diminished, and this often requires replacement of the friction surfaces after a single operation or use of the brake.

SUMMARY OF THE INVENTION

The present invention is directed to a variable torque brake and drum system for use with an elongated flexible restraining member such as a cable or composite rope or strap and which is ideally suited for installing as part of a barrier system to control or restrain vehicle access. The brake system of the invention significantly extends the service life of the system and provides for multiple operations and uses before maintenance is required. The brake system utilizes wet friction technology and the kinetic energy produced by restraining the vehicle is absorbed by liquid brake fluid, and heat from the brake fluid is quickly conducted to the surrounding environment through the brake drum.

In accordance with the illustrated embodiment of the invention, the variable torque brake and drum system constructed in accordance with the invention includes a hollow drum supported by a non-rotatable shaft for rotation on the axis of the shaft. An annular actuating nut is threadably connected to the shaft and is normally connected for rotation with the drum. A stack of interfitting brake plates and brake disks connect the drum to the shaft, and oil-shear cooling fluid is confined within the drum for quickly transferring heat from the brake plates and disks to the rotating drum from which the heat is radiated into the environment. A set of compression springs extend between the actuating nut and the stack of brake plates and disks and is effective to compress the stack through the springs with an increasing axial force in response to rotation of the drum by progressively increasing torque resistance on the drum and the restraint on the flexible restraining member payed out from the drum. The system described also incorporates a detent system which provides for selecting the maximum torque resistance on the drum and a counter system for sensing the continued rotation of the drum after the maximum torque resistance is reached.

Other features and advantages of the invention will be apparent from the following description, the accompanying drawings and the appended claims.

DESCRIPTION OF THE ILLUSTRATED EMBODIMENT

Figure 1:
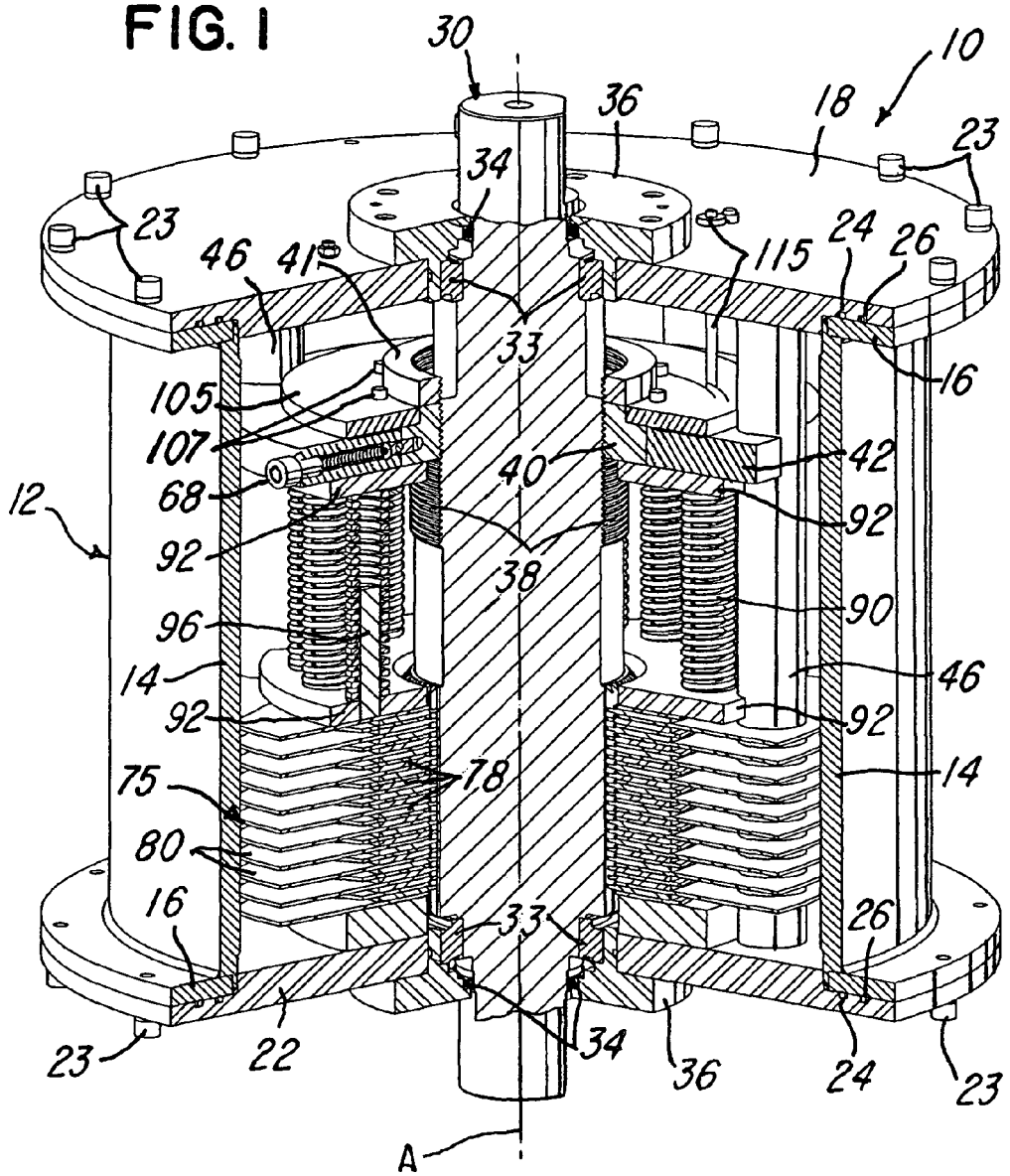
FIG. 1 is a perspective view of a brake and drum system constructed in accordance with the invention and with portions broken away to show internal construction.

Referring to FIG. 1, a variable torque brake and drum system 10 includes a fabricated metal or steel fluid tight drum 12 including a generally cylindrical outer wall 14 having end portions welded to outwardly projecting annular end flanges 16. The end flanges 16 are secured to opposite circular end walls or plates 18 & 22 by peripherally spaced cap screws 23, and a set of concentric resilient sealing rings 24 & 26 form a fluid tight seal between each end plate 18 & 22 and the flanges 16 of the drum 12. The drum 12 is supported for rotation on a non-rotatable metal main shaft 30 by annular roller bearings 33 confined within corresponding end caps 36 secured to the end walls 18. Resilient rings 34 form fluid tight seals with the shaft 30.

The drum 12 is adapted to receive an elongated flexible restraining member (not shown) such as a metal cable or a reinforced composite strap or composite rope which is wound onto the cylindrical outer surface of the drum between the end flanges 16. Depending upon the size of the restraining member, the drum 12 may have substantial size, for example, a diameter of about three feet.

Applicant's system 10 may be used for restraining a moving vehicle, for example, similar to that disclosed in above-mentioned U.S. Pat. No. 7,125,197, the disclosure of which is herein incorporated by reference. In this patent, the outer end portion of a flexible strap extending from a brake is attached to one end portion of a vehicle capture net, and the opposite end portion of the net is connected to another elongated flexible strap which extends to another brake in order to capture and restrain a moving vehicle. A similar vehicle capture net is disclosed in U.S. Pat. No. 8,002,492.

Figure 2:
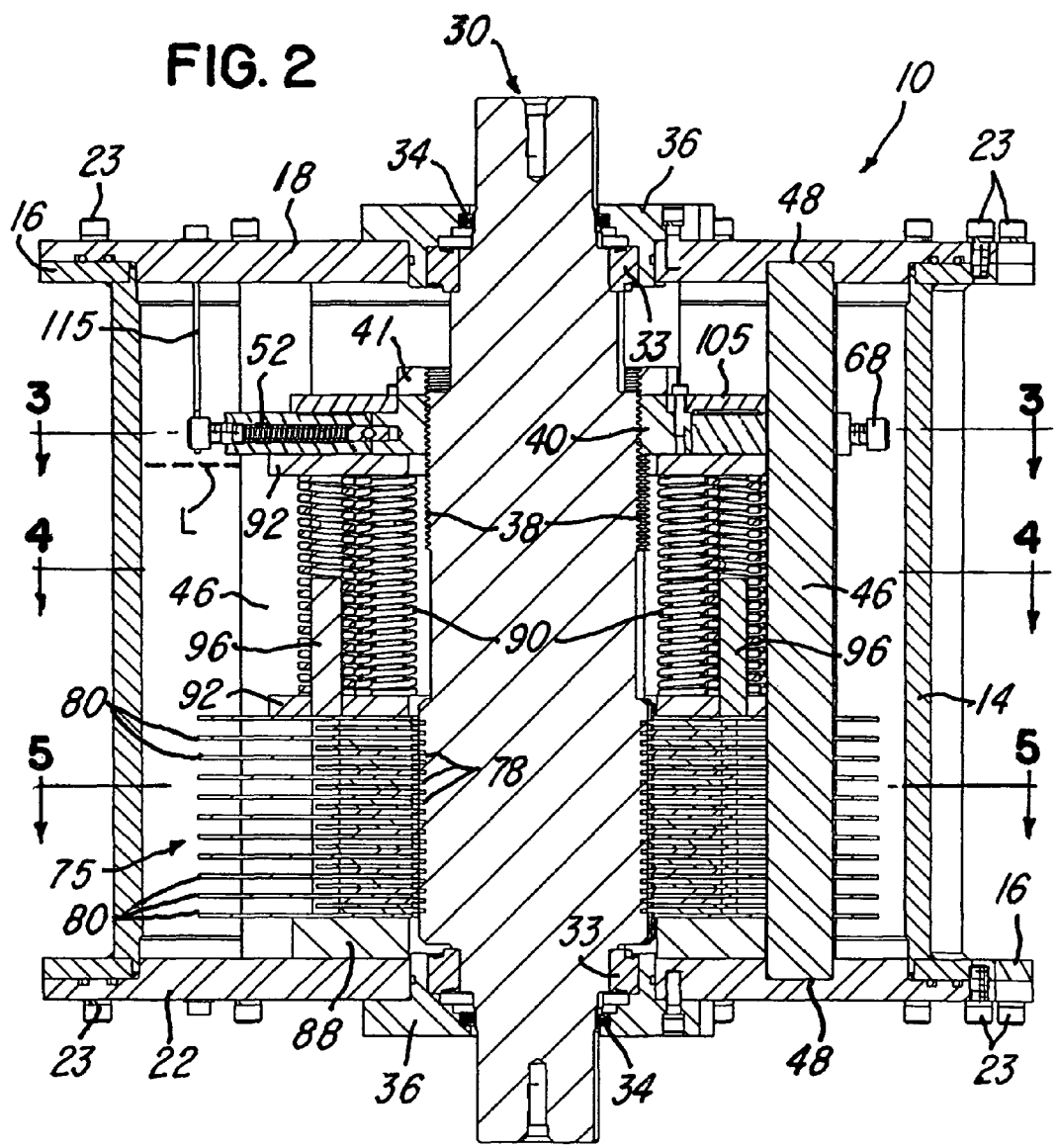
FIG. 2 is an axial section of the system shown in FIG. 1.

As shown in FIGS. 1 & 2, an upper portion of the shaft 30 has a helical thread 38 which is preferably formed by 29 degrees acme thread. An annular actuating nut 40 is connected to the drum 12 and has internal threads which mate with the threads 38 so that the nut moves axially on the shaft 30 in response to rotation of the drum 12. Above the nut 40 is a lock nut 41, and surrounding the nut 40 is an annular detent plate 42 (shown in section in FIG. 3) which has peripherally spaced recesses 44 for receiving axially extending dowels or driver rods 46 each having opposite end portions projecting into corresponding bores 48 (FIG. 2) formed within the inner surfaces of the end plates 18 & 22.

Figure 3:
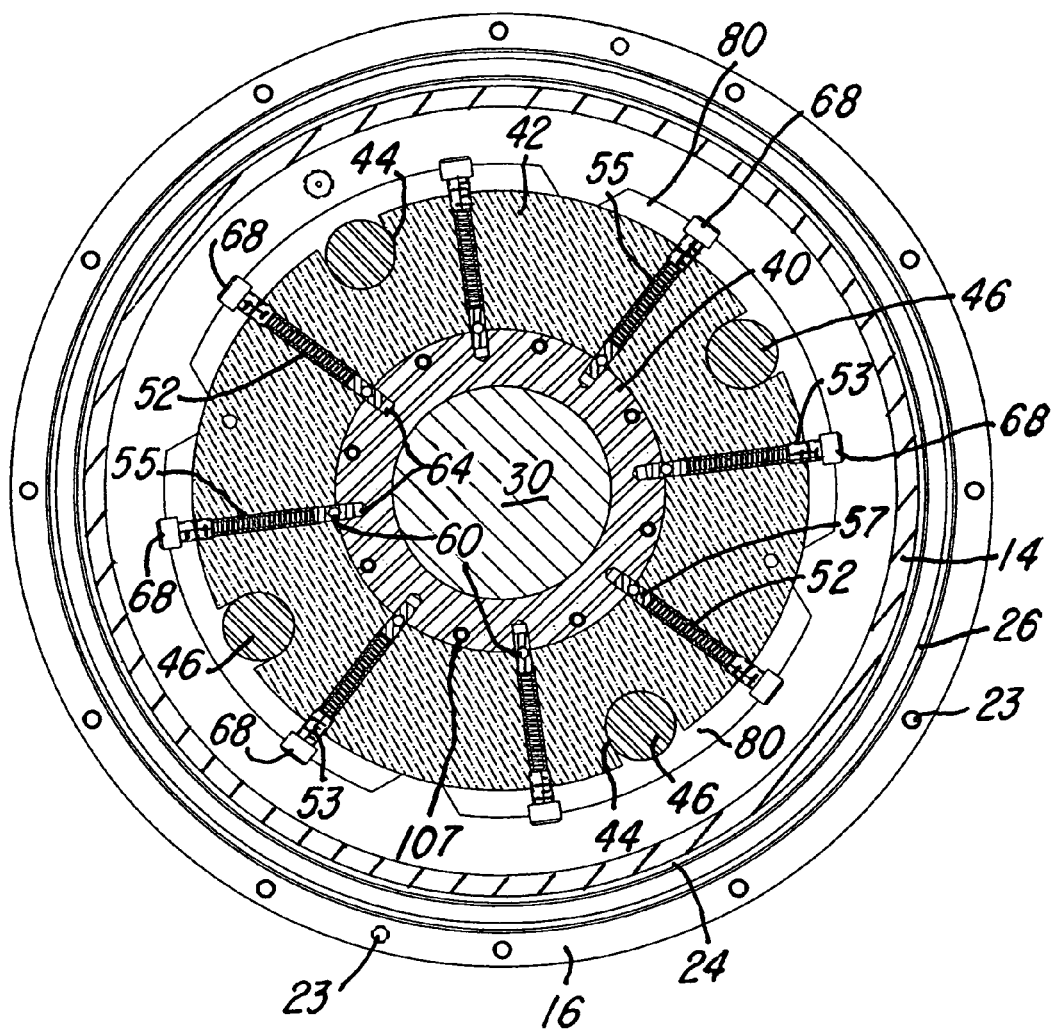
FIGS. 3-5 are radial sections of the brake and drum system, taken generally on the lines 3-3, 4-4 and 5-5, respectively, of FIG. 2.

As also shown in FIG. 3, the detent plate 42 has peripherally spaced and radially extending holes 52 each having a threaded outer end portion 53 and confining an elongated compression spring 55. The inner end portion of each hole 52 confines a hardened detent member or plug 57 (FIG. 6) which has a conical seat 58 engaging a corresponding detent ball 60. The outer cylindrical surface of the actuating nut 40 has peripherally spaced radial bores 62 which align with the radial holes 52, and each bore 62 receives a hardened detent member or plug 64 having a conical seat 66 which also receives the corresponding detent ball 60. A cap screw 68 (FIGS. 3 & 6) has a head portion with a hex recess and is threaded into the outer end portion of each radial hole 52 for adjusting the compression force urged by the corresponding detent spring 55 against the detent ball 60. These detent parts form an adjustable detent mechanism which determines the maximum resistant torque on the drum 12 before the drum rotates relative to the actuating nut 40.

Figure 5:
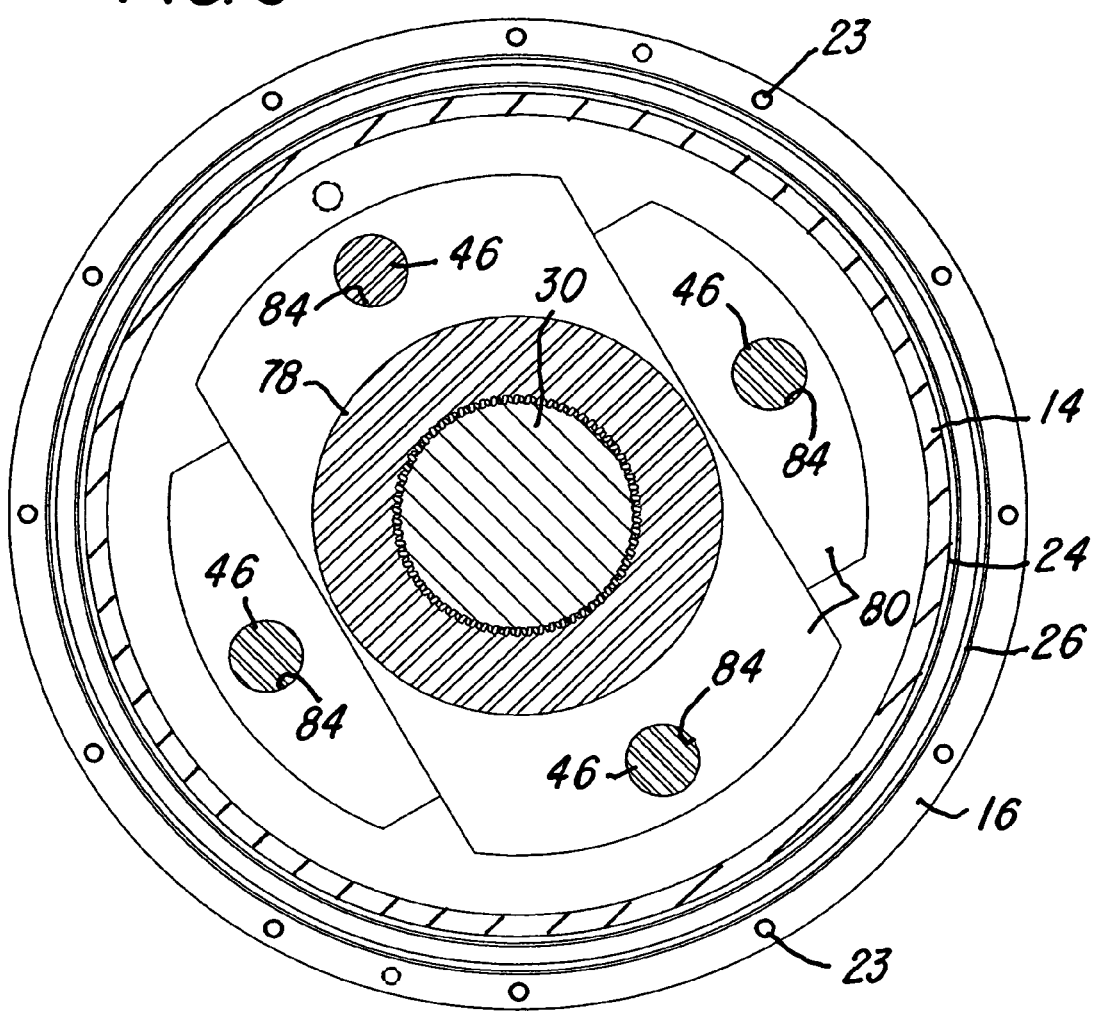

A pack or stack 75 of over ten oil-shear friction brake disks 78 (FIG. 5) and interfitting brake plates 80 are assembled on the shaft 30, and each brake disk 78 and brake plate 80 may be constructed as disclosed in U.S. Pat. No. 3,638,773 which issued to the assignee of the present invention and the disclosure of which is herein incorporated by reference. The stack 75 of interfitting oil-shear brake disks and brake plates are also disclosed in U.S. Pat. Nos. 4,415,067 and 4,648,494 which also issued to the assignee of the present invention. As shown in FIG. 5, the stack of brake disks 78 are splined to the shaft 30 for axial movement, and the interfitting brake plates 80 each has a pair of holes 84 which loosely receive two of the diametrically opposed rods 46 so that the plates 80 are free to move axially on the rods 46 but rotate with the drum 12.

Figure 4:
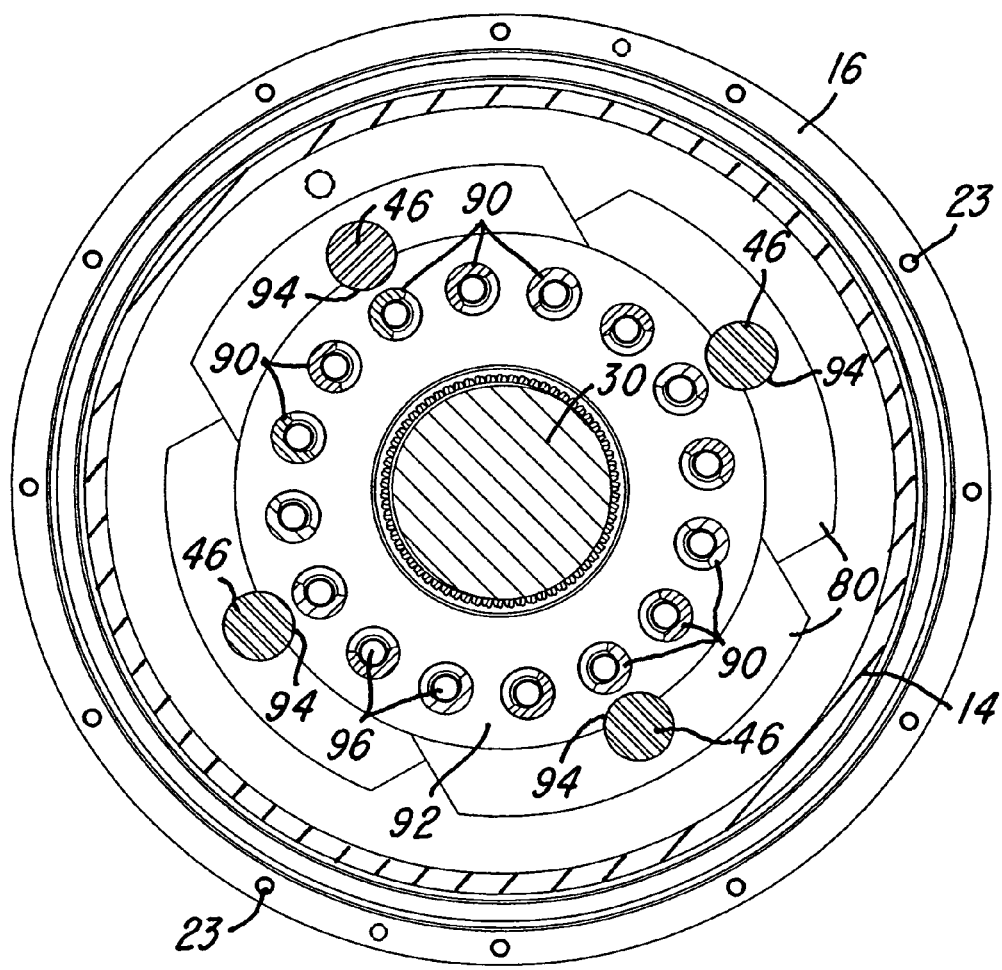

As shown in FIGS. 1 and 2, the stack 75 of friction brake disks 78 and brake plates 80 are supported by an annular plate 88 which seats on to the end wall 22, and a plurality of sixteen compression coil springs 90 (FIG. 4) extend axially above the stack 75. The springs 90 are confined between a pair of spring plates 92 which have peripherally spaced recesses 94 receiving the rods 46 for rotating with the drum 12, and the bottom plate 92 engages the uppermost brake plate 80. Each of the compression coil springs 90 is positioned or located by a corresponding axially extending pin 96 (FIG. 2) which projects upwardly from the bottom spring plate 92 partially into the coil spring.

Figure 6:
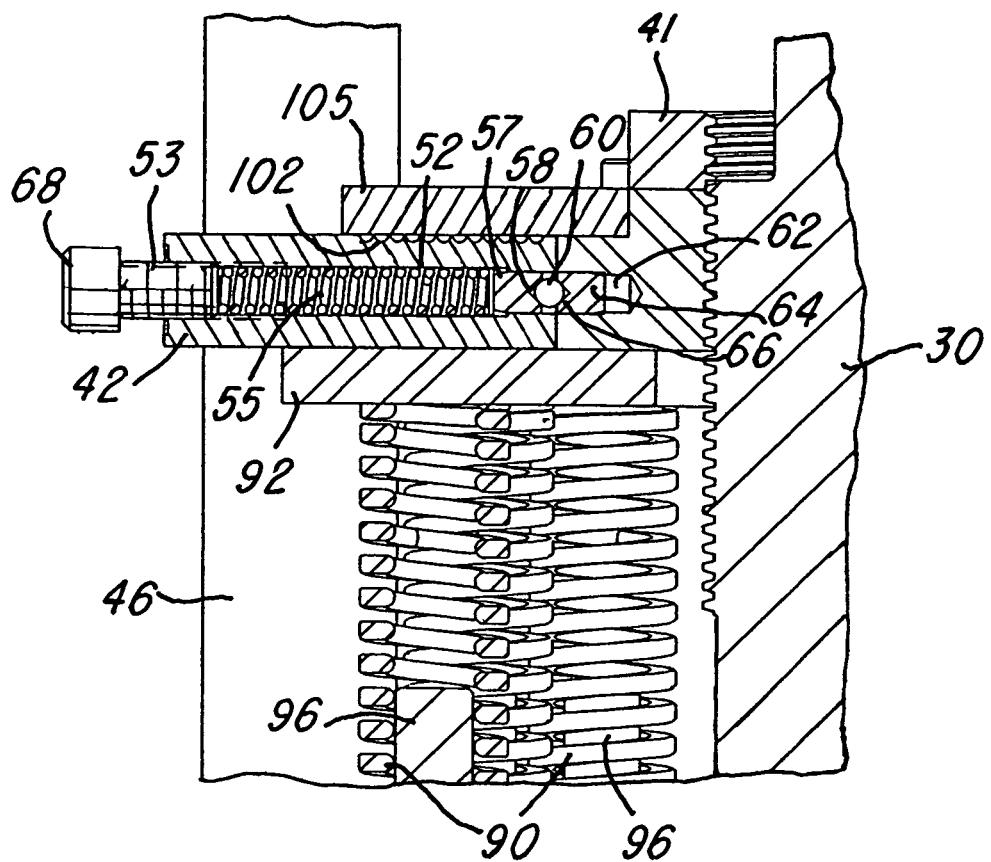
FIG. 6 is an enlarged fragmentary section showing the detent system of the brake and drum system shown in FIG. 2.
Figure 7:
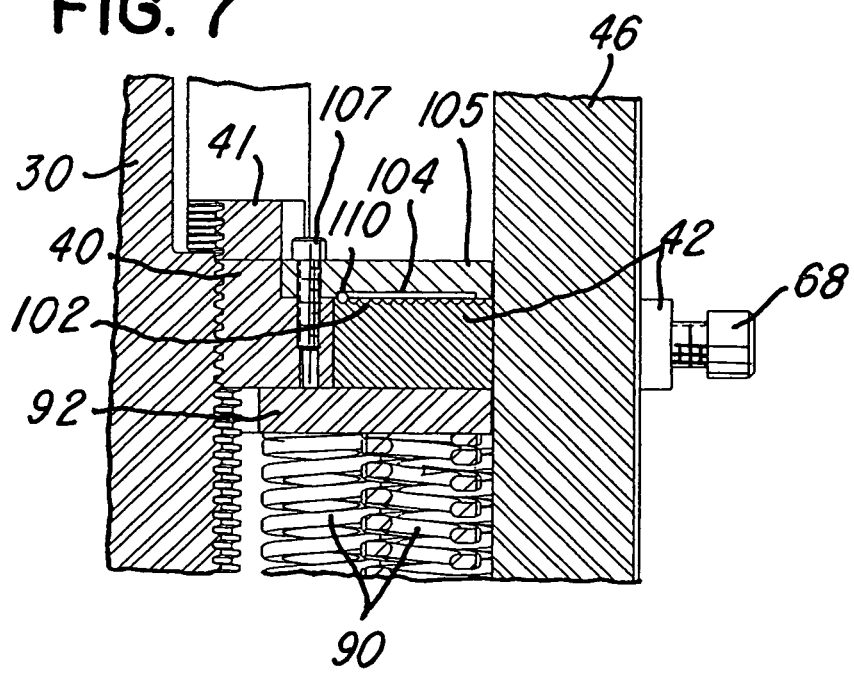
FIG. 7 is another enlarged fragmentary section showing the counter system of the system shown in FIG. 2.

Referring to FIGS. 6 and 7, the flat top surface of the detent plate 42 has a spiral groove 102, and a radially extending groove 104 is formed within the bottom surface of an annular plate 105 secured to the actuating nut 40 by a series of peripherally space cap screws 107. A small steel ball 110 is captured within the grooves 102 and 104 and moves radially outwardly within the radial groove 104 in response to rotation of the detent plate 42 relative to the actuating nut 40.

In operation of the variable torque brake and drum assembly or system 10, the opposite end portions of the main shaft 30 are rigidly supported by a stand (not shown) with the axis A of the shaft preferably vertical, and with the shaft fixed by the stand so that it does not rotate. When the shaft 30 is in a vertical position, the drum 12 is filled with an oil-shear cooling fluid to about a level L, as shown in FIG. 2. In this position, the level of the fluid may be checked using a removable dipstick 115 (FIG. 2). After an elongated flexible restraining member (not shown) such as a flexible strap or composite rope cable is wound onto the outer surface of the drum 12, the variable torque brake and drum system 10 is ready for use, for example, by connecting the outer end portion of the strap or cable to one end portion of a flexible vehicle capture net or other vehicle restraining member. When the flexible restraining member is pulled from the drum 12 causing the drum to rotate, the actuating nut 40 moves or screws downwardly on the stationary shaft 30 by one pitch for each revolution of the drum and progressively increases the axial pressure on the stack 75 of brake disks and plates through the compression springs 90. This pressure progressively increases braking torque on the drum 12 which increases the tension force on the flexible restraining member for quickly decelerating any vehicle which is restrained.

After a predetermined maximum braking torque is applied to the drum 12 and the flexible restraining member continues to be pulled from the drum 12, the detent mechanism permits the detent plate 42 to rotate with the drum around the actuating nut 40 so that the friction brake stack 75 is no longer compressed after the preset maximum torque resistance on the drum is met. Thus the maximum braking torque continues to be applied to the drum as the flexible restraining member continues to be pulled out from the drum, thereby protecting the system 10 from being damaged. The maximum braking torque on the drum 12 may be adjusted by adjusting the screws 68 which control the force required for the detent balls 60 to be cammed from their opposing seats 58 and 66 by compressing the detent springs 55.

After the detent mechanism begins to operate and the detent plate 42 rotates relative to the plate 105 connected to the non-rotating actuating nut 40, the ball 110 (FIG. 7) progressively moves radially outwardly within the radial groove 104 within the non-rotating plate 105 as a result of the spiral groove 102 within the rotating detent plate 42. This feature provides an indication or counter of the rotations of the drum 12 relative to the actuating nut 40 after the maximum braking torque is applied. This feature assists in resetting the brake and drum system 10 when the flexible restraining member is retracted by rewinding the member on the drum 12.

An important and highly desirable feature and advantage of the system 10 is the circulation of the liquid coolant or brake fluid between the brake disks and plates when the drum rotates rapidly and the friction brake stack 75 is quickly compressed so that the heat generated between the brake plates and disks is quickly transferred outwardly against the inner surface of the rotating drum 12 where the heat is radiated to the atmosphere. The rapid removal of the heat from the brake stack 75 by the brake fluid in the rapidly rotating drum substantially extends the service life of the brake and drum system 10 and minimizes the need to service or replace the system 10 after multiple uses. The detent mechanism also provides for a maximum braking torque on the drum 12 and thereby avoids the system from being damaged in the event the flexible restraining member continues to be pulled out from the drum after the maximum braking torque is achieved. Another feature is provided by the indicator or counter system (FIG. 7) which indicates the additional revolutions of the drum 12 after the maximum braking torque has been applied so that the system may be properly reset after use.

While the form of apparatus or system herein described constitutes a preferred embodiment of the invention, it is to be understood that the invention is not limited to this precise form of apparatus or system, and that changes may be made therein without departing from the scope and spirit of the invention as defined in the appended claims.

The invention claimed is:
1. A variable torque brake and drum system adapted to receive an elongated flexible restraining member which is pulled out with a progressively increasing restraining force on the member, said system comprising a fluid-tight hollow drum having a center axis and a generally cylindrical outer wall rigidly connected by opposite end walls, a shaft adapted to be supported for non-rotation and supporting said end walls of said drum for rotation of said drum on said axis relative to said shaft with fluid-tight seals between said end walls and said shaft, an annular actuating nut threadably mounted on said shaft and connected to said drum for rotation with said drum and for axial movement on said shaft in response to rotation of said drum, a stack of interfitting brake plates and brake disks within said drum with said brake plates connected to rotate with said drum and said brake disks connected for non-rotation with said shaft, a volume of liquid oil-shear cooling fluid confined within said drum for flowing between said brake plates and said brake disks, a set of compression springs extending axially between said actuating nut and said stack of interfitting brake plates and brake disks, said actuating nut being effective to compress said stack through said springs with increasing axial force in response to rotation of said drum relative to said shaft for progressively increasing the torque resistance on said drum and the restraining force on the flexible restraining member as said drum rotates, and said cooling fluid being effective to flow outwardly into contact with said outer wall of said drum in response to rotation of said drum for transferring friction heat from said stack to the air surrounding said system.

2. A system as defined in claim 1 and including a first mechanism within said drum for limiting the maximum axial compression force on said stack by said springs and the maximum tension force on the flexible restraining member while said drum continues to rotate in response to the flexible restraining member being pulled from said drum after reaching said maximum axial compression force.

3. A system as defined in claim 2 wherein said first mechanism comprises an annular torque transfer member surrounding said actuating nut and connected to rotate with said drum, and spring biased detent members connecting said torque transfer member to said actuating nut at circumferentially spaced intervals around said actuating nut.

4. A system as defined in claim 3 wherein said detent members comprise circumferentially spaced balls within corresponding opposing recesses within said annular torque transfer member and said actuating nut.

5. A system as defined in claim 2 and including a second mechanism for sensing and indicating continued rotation of said drum relative to said shaft after limiting the maximum axial compression force on said stack.

6. A system as defined in claim 5 wherein said second mechanism for sensing and indicating said continued rotation of said drum, comprises an annular first plate connected to rotate with said actuating nut, an annular second plate connected to rotate with said drum, a radially extending spiral groove within one of said first plate or said second plate, a radially extending groove within the other of said first plate or said second plate and opposing said spiral groove, and a ball extending partially into each said groove.

7. A system as defined in claim 1 and including an annular lock collar threaded onto said shaft adjacent said actuating nut for securing said actuating nut after a preload compression force is selected against said springs by said actuating nut.

8. A system as defined in claim 1 wherein said compression springs are circumferentially spaced around said shaft and extend between parallel spaced spring support plates connected to rotate with said drum, and a set of spring locating pins extend axially from one of said spring support plates into said springs.

9. A system as defined in claim 1 wherein said drum has end flanges projecting radially outwardly from and welded to opposing ends of said outer wall of said drum, and said opposite end walls of said drum are releasably connected and sealed by resilient sealing rings to said flanges to seal said drum and to facilitate assembly of said brake and drum system.

10. A variable torque brake and drum system adapted to receive an elongated flexible restraining member which is pulled out with a progressively increasing restraining force on the member, said system comprising a fluid-tight hollow drum having a center axis and a generally cylindrical outer wall rigidly connected by opposite end walls, a shaft adapted to be supported for non-rotation and supporting said end walls of said drum for rotation of said drum on said axis relative to said shaft with fluid-tight seals between said end walls and said shaft, an annular actuating nut threadably mounted on said shaft and connected to said drum for rotation with said drum and for axial movement on said shaft in response to rotation of said drum, a stack of interfitting brake plates and brake disks within said drum with said brake plates connected to rotate with said drum and said brake disks connected for non-rotation with said shaft, a volume of liquid oil-shear cooling fluid confined within said drum for flowing between said brake plates and said brake disks, a set of compression springs extending axially between said actuating nut and said stack of interfitting brake plates and brake disks, said actuating nut being effective to compress said stack through said springs with increasing axial force in response to rotation of said drum relative to said shaft for progressively increasing the torque resistance on said drum and the restraining force on the flexible restraining member as said drum rotates, said cooling fluid being effective to flow outwardly into contact with said outer wall of said drum in response to rotation of said drum for transferring friction heat from said stack to the air surrounding said system, a detent mechanism within said drum for limiting the maximum axial compression force on said stack by said springs and the maximum tension force on the flexible restraining member while said drum continues to rotate in response to the flexible restraining member being pulled from said drum after reaching said maximum axial compression force, and said detent mechanism including an annular torque transfer member surrounding said actuating nut and connected to rotate with said drum, and spring biased detent members connecting said torque transfer member to said actuating nut at circumferentially spaced intervals around said actuating nut.

11. A system as defined in claim 10 wherein said detent members comprise circumferentially spaced, spring biased balls within corresponding opposing recesses within said annular torque transfer member and said actuating nut, and adjustment screws for adjusting the force applied to said spring biased balls.

12. A system as defined in claim 10 and including a counter mechanism for sensing and indicating continued rotation of said drum relative to said shaft after limiting the maximum axial compression force on said stack.

13. A system as defined in claim 12 wherein said counter mechanism for sensing and indicating said continued rotation of said drum, comprises an annular first plate connected to rotate with said actuating nut and an adjacent annular second plate connected to rotate with said drum, a radially extending spiral groove within one of said first plate or said second plate, a radially extending groove within the other of said first plate or said second plate and opposing said spiral groove, and a ball extending partially into each said groove, wherein the annular torque transfer member is the adjacent annular second plate.

14. A system as defined in claim 12 and including an annular lock collar threaded onto said shaft adjacent said actuating nut for securing said actuating nut after a preload compression force is selected against said springs by said actuating nut.

15. A system as defined in claim 12 wherein said compression springs are circumferentially spaced around said shaft and extend between parallel spaced spring support plates connected to rotate with said drum, and a set of spring locating pins extend axially from one of said spring support plates into said springs.

* * * * *